United States Patent [19]
Eklov et al.

[11] Patent Number: 5,722,759
[45] Date of Patent: Mar. 3, 1998

[54] LAMP ASSEMBLY WITH INVERTED PIVOT MEMBER

[75] Inventors: Kenneth A. Eklov, Farmington Hills; William M. Brown, Brighton; James N. Jorgensen, Warren, all of Mich.

[73] Assignee: Micro Craft, Inc., Novi, Mich.

[21] Appl. No.: 635,752

[22] Filed: Apr. 22, 1996

[51] Int. Cl.$^6$ ............................................. B60Q 1/00
[52] U.S. Cl. .................... 362/80; 362/802; 200/61.52; 200/61.83
[58] Field of Search ................ 362/80, 802; 200/61.52, 200/61.53, 61.83

[56] References Cited

U.S. PATENT DOCUMENTS

| | | | |
|---|---|---|---|
| 1,055,153 | 3/1913 | Ferguson | 200/61.52 |
| 1,484,502 | 2/1924 | James | |
| 2,772,411 | 11/1956 | Cooper | 200/61.52 |
| 2,780,688 | 2/1957 | Stec | 200/61.52 |
| 2,891,235 | 6/1959 | Halpert | 362/80 |
| 3,109,597 | 11/1963 | Baldwin | 362/80 |
| 3,132,221 | 5/1964 | Kachline et al. | 200/61.53 |
| 3,434,106 | 3/1969 | Lawless | 200/61.48 |
| 3,539,741 | 11/1970 | Voland | 20/61.62 |
| 3,548,400 | 12/1970 | Boyd et al. | 200/61.52 |
| 3,553,448 | 1/1971 | Davis | 240/7.1 |
| 3,564,171 | 2/1971 | Hammond | 200/61.52 |
| 3,576,409 | 4/1971 | Fiddler | 200/61.62 |
| 3,601,729 | 8/1971 | Hierta | 335/205 |
| 3,692,992 | 9/1972 | Bain et al. | 240/2 |
| 3,717,732 | 2/1973 | Porter | 200/61.45 |
| 3,748,415 | 7/1973 | Suzuki | 200/61.52 |
| 3,772,646 | 11/1973 | Keith et al. | 340/65 |
| 3,814,875 | 6/1974 | Takada | 200/61.48 |
| 3,898,400 | 8/1975 | Takada | 200/61.48 |
| 4,016,535 | 4/1977 | Dinlocker | 340/52 H |

(List continued on next page.)

OTHER PUBLICATIONS

Letter dated Nov. 21, 1991, from Thomas E. Maher to Chrysler Motors Corporation.
Letter dated Dec. 19, 1991, from Kenneth A. Eklov to Stergios Naoum of Chrysler Motors Corporation.
Interoffice Memorandum dated Feb. 11, 1992, from Tom Maher to Bill Brown.
Copy of Micro Craft Inc. Under–Hood Lamp Assembly drawing, Revision A. dated Mar. 11, 1992.

*Primary Examiner*—Carroll B. Dority
*Attorney, Agent, or Firm*—Marshall, O'Toole, Gerstein, Murray & Borun

[57] ABSTRACT

A lamp assembly having a gravity-actuated switch which is adapted to be mounted to the underside of a hinged cover member of a vehicle to illuminate a compartment of the vehicle when the hinged member is opened to a predetermined extent. The lamp assembly has a housing, a lamp disposed in the housing, first conductor means for electrically interconnecting a first electrical terminal with one terminal of the lamp, second conductor means for electrically interconnecting a second electrical terminal with a first contact point, and third conductor means for electrically interconnecting the other terminal of the lamp with a second contact point. The assembly has a switch for automatically turning on the lamp when the housing is moved to a first angular orientation and turning off the lamp when the housing is moved to a second angular orientation. The switch has a slidable member with a conductive portion, the slidable member being movable between a first position in which the conductive portion of the slidable member electrically interconnects the first and second contact points and a second position in which the first and second contact points are electrically isolated. The assembly may have an inverted pivot member, movable under the influence of gravity, for causing the slidable member to occupy the first position when the housing is in the first angular orientation and for causing the slidable member to occupy the second position when the housing is in the second angular orientation.

17 Claims, 5 Drawing Sheets

U.S. PATENT DOCUMENTS

| | | | |
|---|---|---|---|
| 4,103,842 | 8/1978 | Martin | 200/61.52 |
| 4,316,239 | 2/1982 | Cass et al. | 362/155 |
| 4,320,384 | 3/1982 | Carlson | 200/61.45 M |
| 4,325,059 | 4/1982 | Jaye | 200/61.83 |
| 4,820,888 | 4/1989 | Shields | 200/61.45 M |
| 4,884,179 | 11/1989 | Moore | 362/295 |
| 4,910,634 | 3/1990 | Pipkorn | 361/147 |
| 5,256,839 | 10/1993 | Gallagher | 200/61.52 |
| 5,477,428 | 12/1995 | Brown et al. | 362/80 |
| 5,504,287 | 4/1996 | Cable | 362/80 |

1

LAMP ASSEMBLY WITH INVERTED PIVOT MEMBER

BACKGROUND OF THE INVENTION

The present invention is directed to a lamp assembly having a gravity-actuated switch for selectively supplying electrical power to a lamp.

Gravity-actuated switches have been used in the past to supply power to a lamp provided beneath the hood of an automobile to illuminate the engine when the hood is raised. When the hood is lowered, the gravity-actuated switch disconnects the lamp from the power source. Such switches have also been used on the trunk lid of an automobile.

Various types of gravity-actuated switches have been previously devised. For example, one conventional type of gravity-actuated switch, known as a mercury switch, contains elemental mercury which in its natural liquid state flows under the influence of gravity to selectively interconnect a pair of electrical contacts. Although their operation is generally satisfactory, mercury switches have the disadvantage that they contain mercury, which may cause harm when exposed to the environment.

SUMMARY OF THE INVENTION

The invention is directed to a lamp assembly having a gravity-actuated switch with a relatively simple and reliable design and which presents no environmental problems. A lamp assembly in accordance with the invention is adapted to be mounted to the underside of a hinged cover member of a vehicle to illuminate a compartment of the vehicle when the hinged member is opened to a predetermined extent.

The lamp assembly has a housing, a lamp disposed in the housing, first conductor means for electrically interconnecting a first electrical terminal with one terminal of the lamp, second conductor means for electrically interconnecting a second electrical terminal with a first contact point, and third conductor means for electrically interconnecting the other terminal of the lamp with a second contact point. The assembly has a switch for automatically turning on the lamp when the housing is moved to a first angular orientation and automatically turning off the lamp when the housing is moved to a second angular orientation.

The switch has a slidable member with a conductive portion, the slidable member being movable between a first position in which the conductive portion of the slidable member electrically interconnects the first and second contact points and a second position in which the first and second contact points are electrically isolated.

The assembly may have an inverted pivot member, movable under the influence of gravity, for causing the slidable member to occupy the first position when the housing is in the first angular orientation and for causing the slidable member to occupy the second position when the housing is in the second angular orientation. The inverted pivot member may have a V-shaped lower portion, means for maintaining the lower portion in a substantially fixed position, and a movable upper portion which engages the slidable member to move the slidable member between the first and second positions.

The slidable member may have a carriage with a central aperture adapted to accommodate the upper portion of the inverted pivot member, a conductive member fixed to the carriage, and means for spring-biasing the conductive member relative to the carriage.

2

These and other features and advantages of the present invention will be apparent to those of ordinary skill in the art in view of the detailed description of the preferred embodiment, which is made with reference to the drawings, a brief description of which is provided below.

DETAILED DESCRIPTION OF A PREFERRED EMBODIMENT

Figure 1:
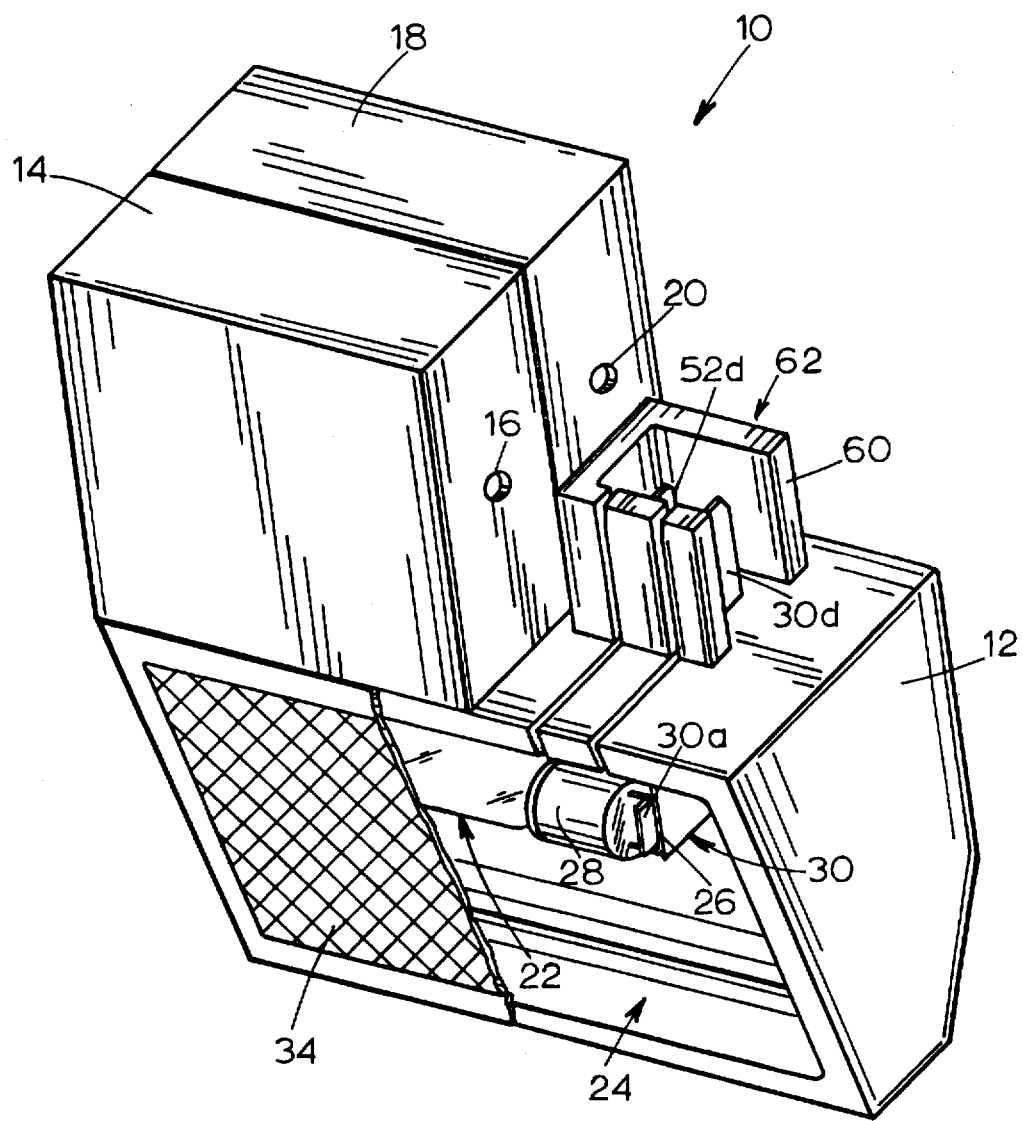
FIG. 1 is a perspective view of a preferred embodiment of an assembly for selectively illuminating a compartment of a vehicle in accordance with the invention.

FIG. 1 is a perspective view of a preferred embodiment of an assembly 10 for selectively illuminating a compartment of a vehicle in accordance with the invention. Referring to FIG. 1, the assembly 10 has a plastic housing formed by a main housing 12, a lower switch cover 14 removably connected to the main housing 12 via a number of plastic screws (not shown) which are threadable through a number of bores 16 formed in the switch cover 14, and an upper switch cover 18 removably connected to the main housing 12 via a number of plastic screws (not shown) which are threadable through into a number of bores 20 formed in the switch cover 18.

A lamp 22 in the form of a cylindrical light bulb is disposed within a lamp chamber 24 formed in the main housing 12. The lamp 22 has a pair of conductive terminals each of which is formed by a metal wire loop 26 connected to a respective metal end cap 28 of the lamp 22. The lamp 22 is supported within the lamp chamber 24 via a pair of rigid, one-piece copper conductors 30, 32, each of which has a respective end 30a, 32a that passes through a respective wire loop 26 of the lamp 22 (see also FIG. 2). The lamp chamber 24 is covered by a translucent lens plate 34.

Figure 2:
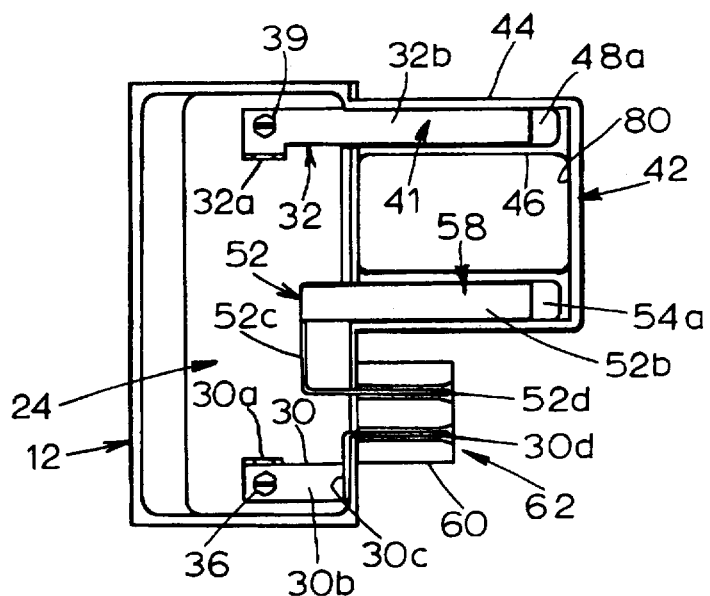
FIG. 2 is a bottom view of a portion of the assembly with portions of the assembly removed.

Referring to FIG. 2, the conductor 30 has a flat conductive portion 30b integrally formed with and perpendicular to the conductive end 30a, a flat conductive portion 30c integrally formed with and perpendicular to the conductive portion 30b, and an electrical terminal in the form of a conductive prong 30d integrally formed with and perpendicular to the conductive portion 30c. The conductor 30 may be anchored to the main housing 12 by a plastic screw 36 which passes through the conductive portion 30b into a threaded hole 38 (FIG. 3) in the main housing 12. The conductor 32 has a flat conductive portion 32b integrally formed with and perpendicular to the conductive portion 32a and which is anchored to the main housing 12 via a screw 39 which passes through the conductive portion 32b into a threaded hole 40 (FIG. 3) in the main housing 12.

Figure 3:
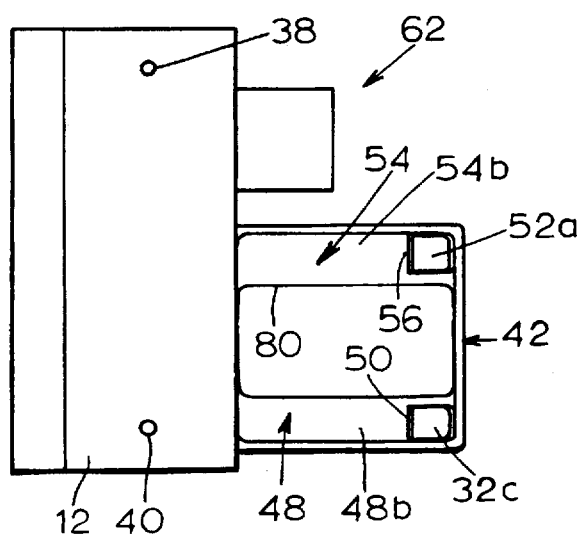
FIG. 3 is a top view of the portion of the assembly shown in FIG. 2.

Referring to FIGS. 2 and 3, the conductive portion 32b is disposed within a channel 41 formed in a plastic switch housing 42 integrally formed with the main housing 12. The channel 41 is defined by a side wall 44 of the switch housing 42, an internal wall 46 parallel to the side wall 44, and a flat track 48 which is perpendicular to the walls 44, 46 and has two sides 48a, 48b. The conductor 32 has a flat end 32c, which acts as a first electrical contact point, which is integrally joined to the conductive portion 32b through a narrow slot 50 formed in the flat track 48.

The assembly 10 has a third one-piece copper conductor 52 which is composed of a flat end 52a, which acts as a second electrical contact point, disposed on a side 54b of a flat track 54, a second conductive portion 52b which is disposed on a side 54a of the track 54 and connected to the flat end 52a through a slot 56 formed in the track 54. The conductive portion 52b, which is disposed within a channel 58 similar to the channel 41, is integrally formed with and perpendicular to a conductive portion 52c that is connected to a prong 52d, which acts as an electrical terminal. The prongs 30d, 52d, together with a housing portion 60 integrally formed with the main housing 12, form an electrical connector 62 which is utilized to connect the assembly 10 to a source of electrical power, such as a battery.

Figure 4:
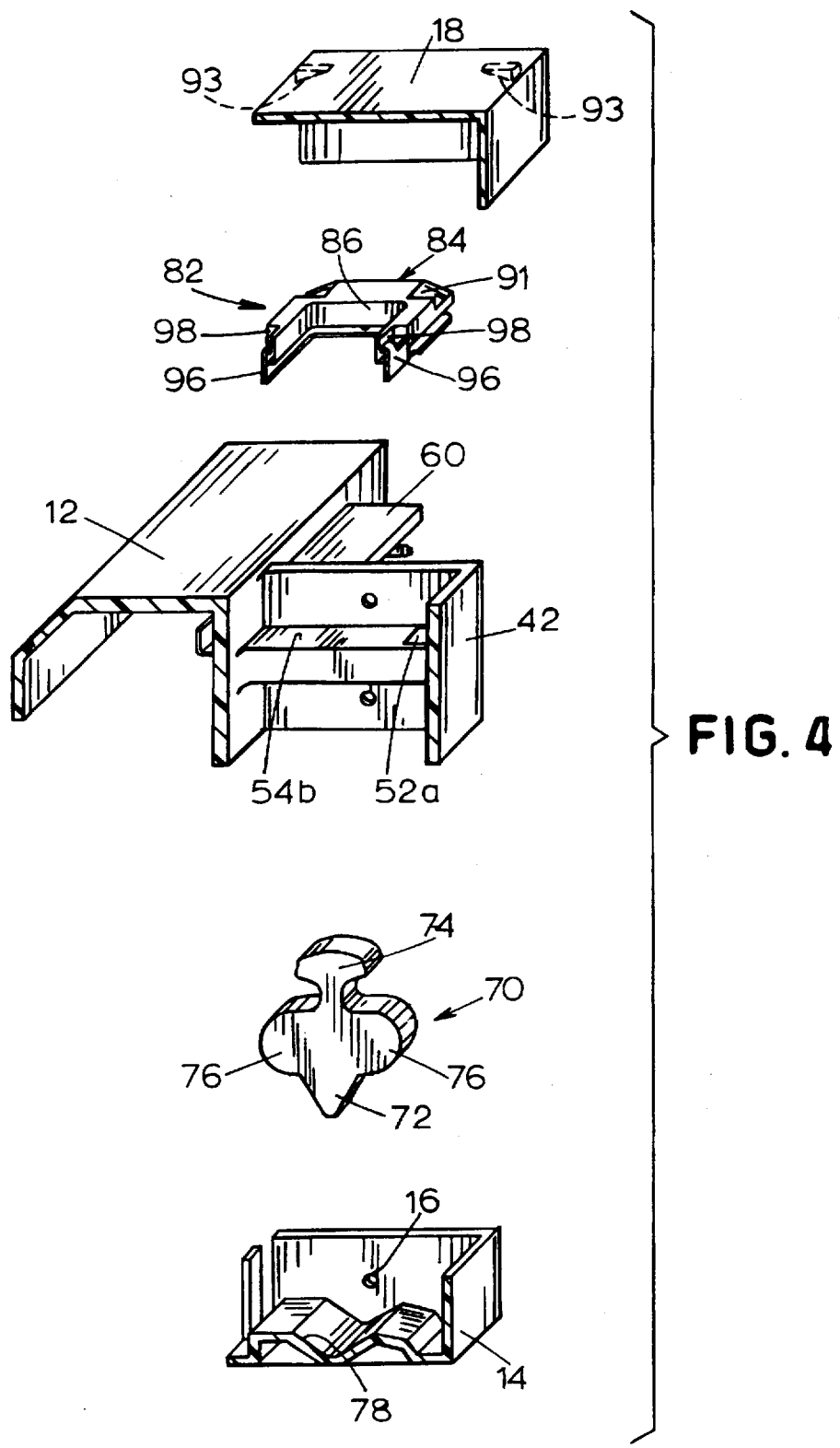
FIG. 4 is an exploded perspective view of the assembly.

The switch housing 42 contains a switch mechanism for automatically turning on the lamp 22 when the assembly 10 is moved to a first angular orientation and automatically turning off the lamp 22 when the assembly 10 is moved to a second angular orientation. Referring to FIG. 4, the switch mechanism has an inverted metal pivot member 70 with a V-shaped lower portion 72, an upper portion 74, and two curved side portions 76. The lower portion 72 of the inverted pivot member 70 is adapted to rest within a V-shaped groove 78 formed in the bottom of the lower switch cover 14.

Figure 5A:
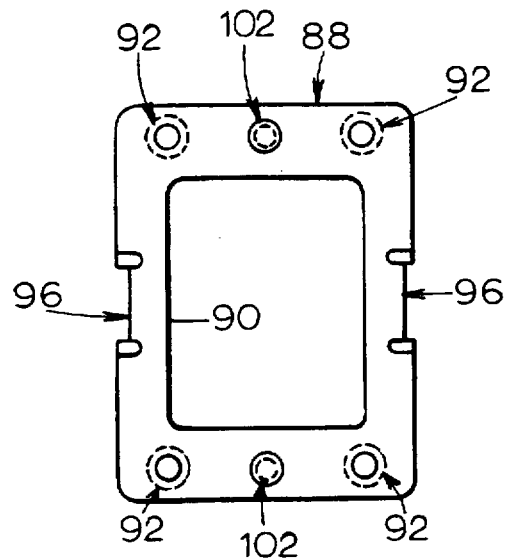
FIG. 5A is a bottom view of a slidable member of the assembly.
Figure 5B:
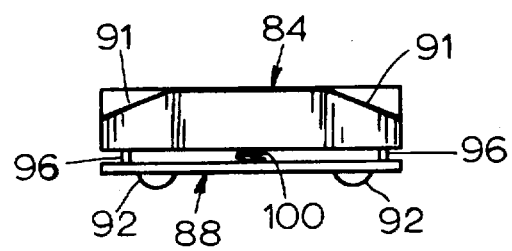
FIG. 5B is a side view of the slidable member shown in FIG. 5A.

The upper portion 74 of the pivot member 70 extends through a rectangular aperture 80 disposed between the two tracks 48, 54 (see FIG. 3). A slidable member 82 is slidably supported on top of the two tracks 48, 54 formed in the switch housing 42. Referring to FIGS. 4, 5A and 5B, the slidable member 82 has a plastic carriage 84 with a rectangular central aperture 86 formed therein and a conductive copper plate 88 having a rectangular central aperture 90 formed therein. Each of the four upper corners of the carriage 84 may be provided with an angled portion 91, and the interior of the upper switch cover 18 may be provided with four angled portions 93.

The lower side of the conductive plate 88 has four spherical deformations 92 which extend downwardly from the member 88 and which make sliding contact with the upper surfaces 48b, 54b of the tracks 48, 54. The conductive plate 88 is connected to the carriage 84 via a pair of connecting clamps 96 which are integrally formed with the member 88, each of the clamps 96 being retained within a respective slot 98 formed in the carriage 84. The conductive plate 88 is biased away from the carriage 84 via a pair of springs 100, each of which has a first end that extends within a bore (not shown) formed in the underside of the carriage 84 and a second end which is seated on an upwardly pointing spherical deformation 102 formed in the conductive plate 88 (see FIG. 5A). The components 30, 32, 52, 88 may be composed of other conductive materials instead of copper. Instead of providing screws to hold the switch covers 14, 18 to the housing 12, other means of connection could be used, such as conventional snap-fit connections. Similarly, the conductors 30, 32 could be fixed to the interior of the housing 12 via any type of conventional connections means other than screws 36, 39.

The operation of the assembly 10 is described below in connection with FIGS. 6 and 7, which illustrate the assembly 10 connected to the underside of a hinged cover member 110, such as the trunk lid or hood of a car, via an optional mounting member shown schematically at 112. The lamp 22 is automatically turned on and off due to the pivoting action of the inverted pivot member 70, which automatically pivots under the influence of gravity, and the resultant movement of the sliding member 82.

Figure 6:
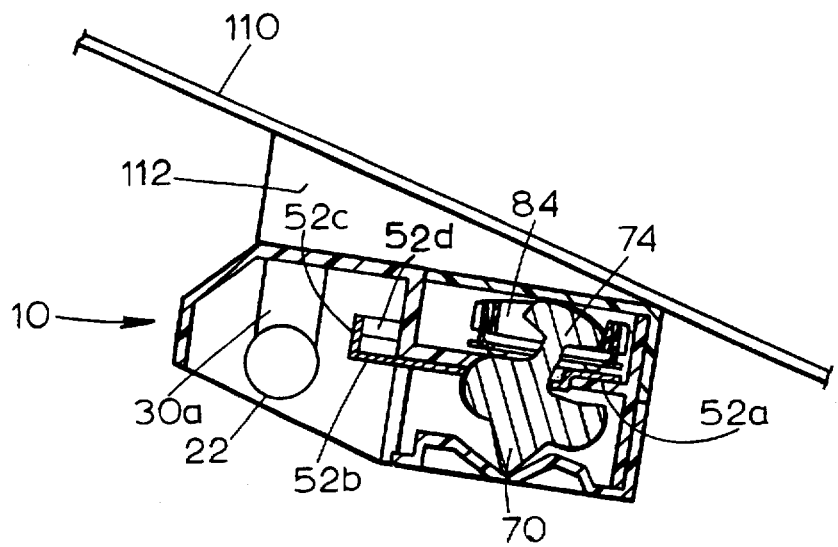
FIG. 6 is a cross-sectional side view of the assembly shown mounted to a hinged member of a vehicle when the hinged member is in a raised position.

Referring to FIG. 6, when the hinged member 110 is moved to a raised position, the right side of the upper portion 74 of the inverted pivot member 70 makes contact with a right interior wall of the plastic carriage 84, causing the slidable member 82 to slide along the two tracks 48, 54 rightwardly to the position shown in FIG. 6. When the slidable member 82 is in the position shown in FIG. 6, the rightmost two of the downwardly extending conductive deformations 92 make conductive contact with the conductive contact points 32c, 54a (see also FIG. 3), thus causing the two contact points 32c, 54a to be conductively interconnected since the conductive deformations 92 are conductively interconnected by the conductive plate 88. Due to the conductive interconnection of the contact points 32c, 54a, each terminal 26 of the lamp 22 is connected to one of the prongs 30d, 52d of the electrical connector 62, causing the source of electrical power to illuminate the lamp 22.

Figure 7:
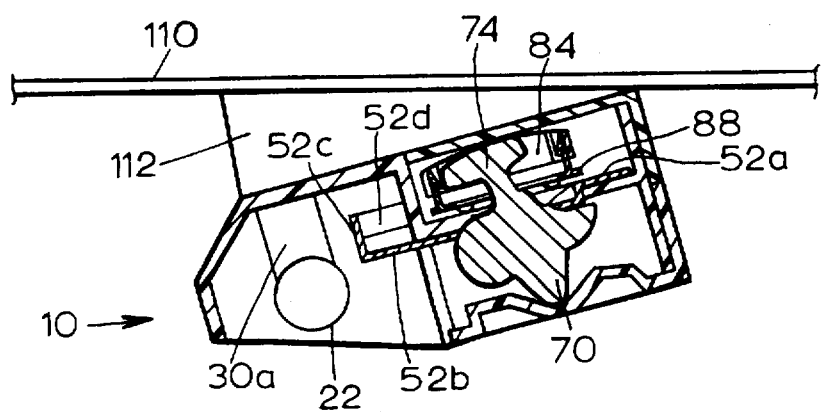
FIG. 7 is a cross-sectional side view of the assembly shown mounted to the hinged member of the vehicle when the hinged member is in a lowered position.

Referring to FIG. 7, when the hinged member 110 is moved to a closed position, the left side of the upper portion 74 of the inverted pivot member 70 makes contact with a left interior wall of the plastic carriage 84, causing the member 82 to slide along the two tracks 48, 54 leftwardly to the position shown in FIG. 7. When the slidable member 82 is in the position shown in FIG. 7, none of the downwardly extending conductive deformations 92 make contact with the conductive contact points 32c, 54a so that the two contact points 32c, 54a remain conductively isolated from each other, thus breaking the conductive path between the lamp terminal 26 connected to the conductive portion 32a and the prong 52d of the electrical connector 62 and causing the lamp 22 to be turned off.

When the slidable member 82 is in the position shown in FIG. 6, the two rightmost angled portions 91 on the carriage 84 (see FIG. 4) make contact with the two rightmost angled portions 93 on the underside of the upper switch cover 18, thus causing the slidable member 82 to be forced downwardly so that the conductive deformations 92 of the conductive member 88 maintain constant contact with the contact points 52a, 32c (FIG. 3), thus preventing any flickering of the lamp 22. Similarly, when the slidable member 82 is in the position shown in FIG. 7, the two leftmost angled portions 91 on the carriage 84 (see FIG. 4) make contact with the two leftmost angled portions 93 on the underside of the upper switch cover 18.

The optional mounting member 112 is designed to mount the assembly 10 to the hinged member 110 at an angle. Whether or not the mounting member 112 is necessary depends upon the slope of the closed hood or trunk lid of the car to which the assembly 10 is to be mounted. In particular, if the hood or trunk lid of the car is horizontal when closed as shown in FIG. 7, it is desirable to use the angled mounting member 112 to ensure that the inverted pivot member 70 pivots to the left as shown in FIG. 7 when the hood or trunk lid is closed. Alternatively, where the hood or trunk lid slopes downwardly when in the closed position, it may be unnecessary to utilize the angled mounting member 112, and the assembly 10 may simply be connected to the hinged member 110 via any conventional mounting means, such as screws or snaps.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. An assembly for selectively illuminating a compartment of a vehicle, said assembly comprising:
   a hinged member adapted to cover said vehicle compartment, said hinged member being movable between a closed position in which said vehicle compartment is covered by said hinged member and an open position in which said vehicle compartment is not covered by said hinged member;
   a housing;
   means for connecting said housing to said hinged member;
   a lamp disposed in said housing, said lamp having a first lamp terminal and a second lamp terminal;
   first conductor means for electrically interconnecting a first electrical terminal with said first lamp terminal;
   second conductor means for electrically interconnecting a second electrical terminal with a first contact point;
   third conductor means for electrically interconnecting said second lamp terminal with a second contact point; and
   switch means for automatically turning on said lamp when said hinged member is moved to said open position and for automatically turning off said lamp when said hinged member is moved to said closed position, said switch means comprising:
      a slidable member having a conductive portion, said slidable member being movable between a first position in which said conductive portion electrically interconnects said first and second contact points and a second position in which said first and second contact points are electrically isolated; and
      inverted pivot means, movable under the influence of gravity, for causing said slidable member to occupy said first position when said hinged member is in said open position and for causing said slidable member to occupy said second position when said hinged member is in said closed position, said inverted pivot means comprising:
         a lower portion;
         means for maintaining said lower portion in a substantially fixed position; and
         a movable upper portion which engages said slidable member to move said slidable member between said first and second positions.

2. An assembly as defined in claim 1 wherein said slidable member comprises a carriage having a central aperture adapted to accommodate said upper portion of said inverted pivot means and a conductive member fixed to said carriage.

3. An assembly as defined in claim 2 additionally comprising means for spring-biasing said conductive member relative to said carriage.

4. An assembly as defined in claim 1 wherein said means for maintaining said lower portion of said inverted pivot means in a substantially fixed position comprises a V-shaped groove formed in said housing.

5. An assembly as defined in claim 1 wherein said switch means additionally comprises a pair of tracks for slidably supporting said slidable member.

6. A lamp assembly adapted to be mounted to the underside of a hinged cover member of a vehicle to illuminate a compartment of the vehicle when the hinged member is opened to a predetermined extent, said lamp assembly comprising:
   a housing;
   a lamp disposed in said housing, said lamp having a first lamp terminal and a second lamp terminal;
   first conductor means for electrically interconnecting a first electrical terminal with said first lamp terminal;
   second conductor means for electrically interconnecting a second electrical terminal with a first contact point;
   third conductor means for electrically interconnecting said second lamp terminal with a second contact point; and
   switch means for automatically turning on said lamp when said housing is moved to a first angular orientation and for automatically turning off said lamp when said housing is moved to a second angular orientation, said switch means comprising:
      a slidable member having a conductive portion, said slidable member being movable between a first position in which said conductive portion electrically interconnects said first and second contact points and a second position in which said first and second contact points are electrically isolated; and
      inverted pivot means, movable under the influence of gravity, for causing said slidable member to occupy said first position when said housing is in said first angular orientation and for causing said slidable member to occupy said second position when said housing is in said second angular orientation, said inverted pivot means comprising:
         a lower portion;
         means for maintaining said lower portion in a substantially fixed position; and
         a movable upper portion which engages said slidable member to move said slidable member between said first and second positions.

7. An assembly as defined in claim 6 wherein said slidable member comprises a carriage having a central aperture adapted to accommodate said upper portion of said inverted pivot means and a conductive member fixed to said carriage.

8. An assembly as defined in claim 7 additionally comprising means for spring-biasing said conductive member relative to said carriage.

9. An assembly as defined in claim 6 wherein said means for maintaining said lower portion of said inverted pivot means in a substantially fixed position comprises a V-shaped groove formed in said housing.

10. An assembly as defined in claim 6 wherein said switch means additionally comprises a pair of tracks for slidably supporting said slidable member.

11. A lamp assembly adapted to be mounted to the underside of a hinged cover member of a vehicle to illuminate a compartment of the vehicle when the hinged member is opened to a predetermined extent, said lamp assembly comprising:
   a housing;
   a lamp disposed in said housing, said lamp having a first lamp terminal and a second lamp terminal; and
   switch means for automatically turning on said lamp when said housing is moved to a first angular orientation and for automatically turning off said lamp when said housing is moved to a second angular orientation, said switch means comprising:
      slidable means for causing one of said lamp terminals to be connected to an electrical terminal when said slidable means is in a first position and for causing one of said lamp terminals to be disconnected from said electrical terminal when said slidable means is in a second position; and inverted pivot means, movable under the influence of gravity, for causing said slidable means to occupy said first position when said housing is in said first angular orientation and for causing said slidable means to occupy said second position when said housing is in said second angular orientation.

12. An assembly as defined in claim 11 wherein said inverted pivot means comprises:

a lower portion;

means for maintaining said lower portion in a substantially fixed position; and a movable upper portion which engages said slidable means to move said slidable means between said first and second positions.

13. A lamp assembly adapted to be mounted to the underside of a hinged cover member of a vehicle to illuminate a compartment of the vehicle when the hinged member is opened to a predetermined extent, said lamp assembly comprising:

a housing;

a lamp disposed in said housing, said lamp having a first lamp terminal and a second lamp terminal; and switch means for automatically turning on said lamp when said housing is moved to a first angular orientation and for automatically turning off said lamp when said housing is moved to a second angular orientation, said switch means comprising:

movable means for causing one of said lamp terminals to be connected to an electrical terminal when said movable means is in a first position and for causing one of said lamp terminals to be disconnected from said electrical terminal when said movable means is in a second position; and inverted pivot means, movable under the influence of gravity, for causing said movable means to occupy said first position when said housing is in said first angular orientation and for causing said movable means to occupy said second position when said housing is in said second angular orientation, wherein said movable means comprises a carriage having a central aperture adapted to accommodate said upper portion of said inverted pivot means and a conductive member fixed to said carriage.

14. An assembly as defined in claim 13 additionally comprising means for spring-biasing said conductive member relative to said carriage.

15. A lamp assembly adapted to be mounted to the underside of a hinged cover member of a vehicle to illuminate a compartment of the vehicle when the hinged member is opened to a predetermined extent, said lamp assembly comprising:

a housing;

a lamp disposed in said housing, said lamp having a first lamp terminal and a second lamp terminal; and switch means for automatically turning on said lamp when said housing is moved to a first angular orientation and for automatically turning off said lamp when said housing is moved to a second angular orientation, said switch means comprising:

movable means for causing one of said lamp terminals to be connected to an electrical terminal when said movable means is in a first position and for causing one of said lamp terminals to be disconnected from said electrical terminal when said movable means is in a second position; and inverted pivot means, movable under the influence of gravity, for causing said movable means to occupy said first position when said housing is in said first angular orientation and for causing said movable means to occupy said second position when said housing is in said second angular orientation, wherein said switch means additionally comprises a pair of tracks for slidably supporting said movable means.

16. A lamp assembly adapted to be mounted to the underside of a hinged cover member of a vehicle to illuminate a compartment of the vehicle when the hinged member is opened to a predetermined extent, said lamp assembly comprising:

a housing;

a lamp disposed in said housing, said lamp having a first lamp terminal and a second lamp terminal;

first conductor means for electrically interconnecting a first electrical terminal with said first lamp terminal;

second conductor means for electrically interconnecting a second electrical terminal with a first contact point;

third conductor means for electrically interconnecting said second lamp terminal with a second contact point; and switch means for automatically turning on said lamp when said housing is moved to a first angular orientation and for automatically turning off said lamp when said housing is moved to a second angular orientation, said switch means comprising a slidable member having a conductive portion, said slidable member being movable between a first position in which said conductive portion electrically interconnects said first and second contact points and a second position in which said first and second contact points are electrically isolated, additionally comprising inverted pivot means operatively coupled to said slidable member.

17. A lamp assembly adapted to be mounted to the underside of a hinged cover member of a vehicle to illuminate a compartment of the vehicle when the hinged member is opened to a predetermined extent, said lamp assembly comprising:

a housing;

a lamp disposed in said housing, said lamp having a first lamp terminal and a second lamp terminal;

first conductor means for electrically interconnecting a first electrical terminal with said first lamp terminal;

second conductor means for electrically interconnecting a second electrical terminal with a first contact point;

third conductor means for electrically interconnecting said second lamp terminal with a second contact point; and switch means for automatically turning on said lamp when said housing is moved to a first angular orientation and for automatically turning off said lamp when said housing is moved to a second angular orientation, said switch means comprising a slidable member having a conductive portion, said slidable member being movable between a first position in which said conductive portion electrically interconnects said first and second contact points and a second position in which said first and second contact points are electrically isolated, wherein said switch means additionally comprises a pair of tracks for slidably supporting said slidable member.

* * * * *